US007571479B2

(12) United States Patent  
Eastlake, III

(10) Patent No.: US 7,571,479 B2
(45) Date of Patent: Aug. 4, 2009

(54) DENIAL OF SERVICE DEFENSE BY PROXY

(75) Inventor: Donald E. Eastlake, III, Ashland, MA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 11/614,447

(22) Filed: Dec. 21, 2006

(65) Prior Publication Data

US 2007/0180511 A1 Aug. 2, 2007

Related U.S. Application Data

(63) Continuation of application No. 10/201,244, filed on Jul. 22, 2002, now Pat. No. 7,162,740.

(51) Int. Cl.
*G06F 11/00* (2006.01)
(52) U.S. Cl. .................. 726/23; 709/224; 709/225
(58) Field of Classification Search .................. 726/23, 726/11, 12, 22, 24; 713/153, 188; 709/224, 709/225, 229
See application file for complete search history.

(56) References Cited

U.S. PATENT DOCUMENTS

| 6,088,804 | A  | * | 7/2000  | Hill et al. ...................... 726/25  |
| 6,226,684 | B1 | * | 5/2001  | Sung et al. ................... 709/238   |
| 6,587,600 | B1 | * | 7/2003  | Shipley ....................... 382/284   |
| 7,383,573 | B2 | * | 6/2008  | Coley et al. .................... 726/12  |
| 7,389,358 | B1 | * | 6/2008  | Matthews et al. ........... 709/238       |
| 2002/0002686 | A1 | * | 1/2002 | Vange et al. ................. 713/201   |
| 2002/0103916 | A1 | * | 8/2002 | Chen et al. ................... 709/229  |
| 2003/0023712 | A1 | * | 1/2003 | Zhao et al. ................... 709/223  |
| 2005/0235359 | A1 | * | 10/2005 | Coley et al. .................... 726/23 |

* cited by examiner

*Primary Examiner*—Beemnet W Dada
(74) *Attorney, Agent, or Firm*—Larry T. Cullen

(57) ABSTRACT

A method and apparatus which defends a host, which is coupled to the Internet, via a defensive firewall/router, against a denial of service attack. The technique includes periodically determining the status of the host, storing the status of the host, receiving at the defensive firewall/router a request from an entity on the Internet for service from the host, and responding to the entity in accordance with the stored status. The period that is set is not related to the request.

13 Claims, 2 Drawing Sheets

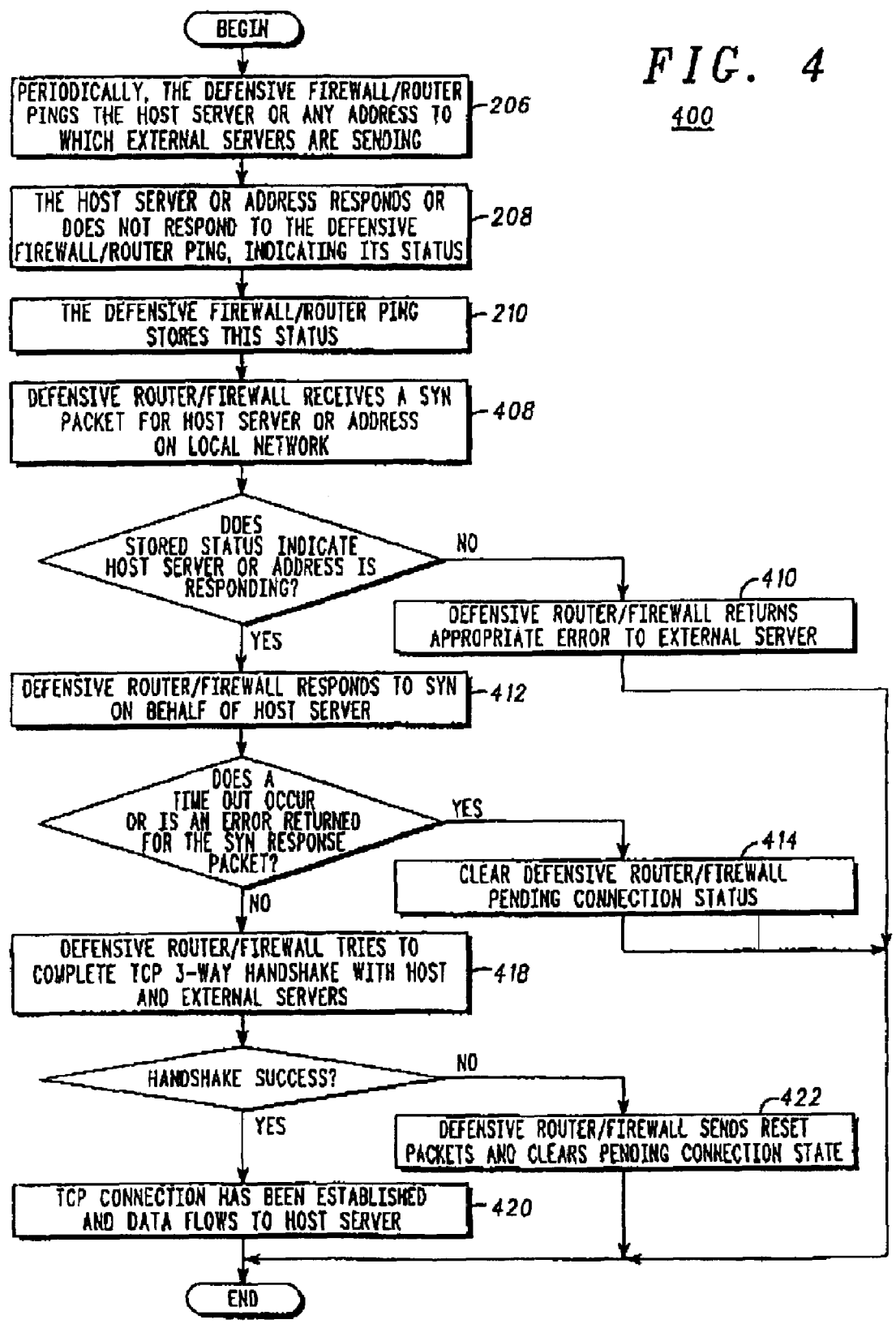

DENIAL OF SERVICE DEFENSE BY PROXY

This application is continuation of U.S. Ser. No.: 10/201,244 filed on Jul. 22, 2002, and now U.S. Pat. No. 7,162,740.

BACKGROUND

The present invention relates to the Internet. More specifically, the present invention relates to Internet security features.

The use of the Internet by both individuals and businesses has increased dramatically during the last few years. One area that has seen particularly robust growth is the introduction by cable television providers of Internet service over the existing cable television infrastructure. This type of system typically known as "always on, rarely protected" is used extensively in homes, schools, libraries and other venues without trained system administration and security staff. This has exacerbated problems caused by individuals attempting to bring down computer systems connected to the Internet in such a manner.

Denial of service (DOS) attacks, for example, are one type of attack that are an increasing problem While some DOS attacks exploit subtle flaws in the host being attacked, the most basic low level attacks are based on bandwidth exhaustion. That is, the links (usually one) to the host being attacked are so saturated with DOS traffic that legitimate packets cannot get through. Because such denial of service attacks do not depend on any flaw at the target host, no fix at the host can solve them.

Typically, a DOS target host or target local network is connected to the Internet via a router or firewall such that these is considerably greater bandwidth between the Internet and the firewall/router than there is between the firewall/router and the target host. In a low level DOS attack, the flood of traffic on the one or more connections between tile firewall/router and the Internet cannot be supported by the smaller connection between the firewall/router and the target, which results in high packet loss at the firewall/router Legitimate packets that are dropped are denied transport to the host which leads to the general denial of Internet service.

With the current state of the Internet, such attacks become a bandwidth contest. If the attacker has more bandwidth at their command than the link (or links) to the target, the attacker wins unless effective countermeasures have been implemented at the defensive firewall/router.

Countermeasures that have been taken thus far have been quite crude and damaging, such as blocking all Internet Control Message Protocol (ICMP) echo packets, since the packets are used by some denial of service tools. Such blockage, though, stops legitimate use of the "ping" traceroute facilities for network management. Narrower blocking may consist of throwing away all packets from a particular block of IP source addresses However, this can only be done after it has been determined that an attack is coming from those particular addresses.

Accordingly, there exists a need for an improved method of defending against attacks on a host server.

SUMMARY AND OBJECTS OF THE INVENTION

This invention shields a host or local network from excess traffic through the use of defensive proxy. This proxy occurs before the limited bandwidth link or links which connect the host or local network to the Internet, and thus shields this link or links from becoming saturated with traffic, particularly illegitimate traffic The defensive proxy does so by simulating sonic aspects of the host or local network Through this simulation, it can respond directly to traffic without forwarding that traffic over the limited bandwidth link or to the host or local network which may be under denial of service attack.

BRIEF DESCRIPTION OF THE DRAWINGS

FIG. 4 is a flow diagram of an alternate embodiment of the present invention.

DETAILED DESCRIPTION OF THE PREFERRED EMBODIMENTS

Figure 1:
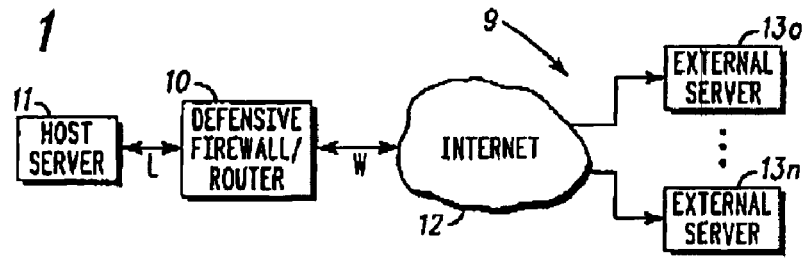
FIG. 1 is a block diagram of an Internet communication network coupled to a host.

The preferred embodiment will be described with reference to the drawing figures where like numerals represent like elements throughout.

Figure 2:
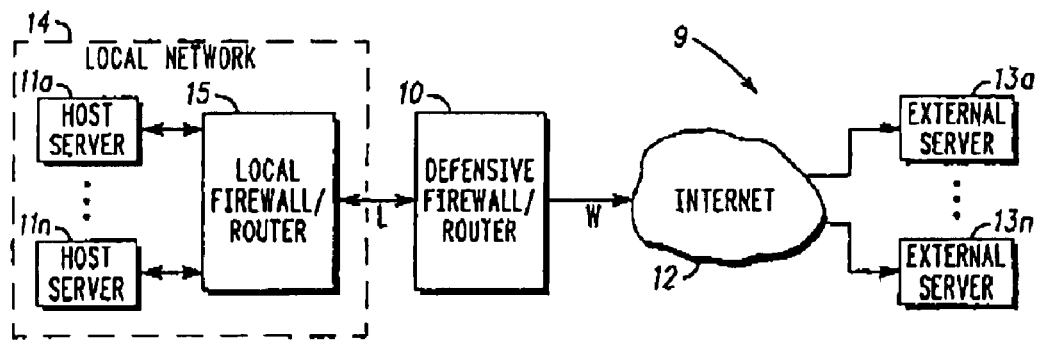
FIG. 2 is a block diagram of an Internet communication network coupled to a local network.

FIG. 1 and FIG. 2 are block diagrams of typical connections to an Internet communication network As shown in FIG. 1, the Internet communication network 9 comprises a plurality of external servers 13a ... 13n and the Internet communication infrastructure 12, which includes one or more intermediate computer servers, routers and the fiber optic, coaxial, wireless or telephone interconnections between them (not shown) The Internet communication infrastructure 12 may be connected to a defensive firewall/router 10 and a host server 11 as shown in FIG. 1, or a defensive firewall/router 10 coupled to a local network 14 comprising a local firewall/router 15 and one or more host servers 11a-11n as shown in FIG. 2 It should be noted that the local network 14 may comprise any one of an almost unlimited number of configurations and FIG. 2 should not be taken to limit the scope of the present invention.

In accordance with the present invention, the firewall/router 10 acts as a defensive proxy between the host server 11 (or local network 14) and any external servers 13a-13n connected to the Internet infrastructure 12 to protect the host server 11 (or local network 14) from attack, such as a DOS attack Acting as a proxy, the defensive firewall/router 10 monitors and intercepts any and all requests that come in from the Internet infrastructure 12 The present invention used in the defense of a DOS attack, will be discussed hereinafter for exemplary purposes. However, many types of traffic flood attack on the host server 11 or local network 14 which is designed to eliminate the ability of the host server 11 or local network 14 to respond to tile requests from one or more external servers 13a ... 13n may be defended against in a similar manner.

The firewall/router 10 monitors and intercepts all requests (pings) to the host server 11. A ping is a standard network utility which is used to determine if a remote device, such as a host server 11, can be reached via the Internet infrastructure 12 and, if so, how fast the current connection is As stated hereinbefore, DOS attacks utilize these pings to flood the connection L between the host server 11 and the firewall/router 10 or the local network 14. The attacker attempts to exhaust the bandwidth of this connection L, thereby leading to packet loss and denial of service to legitimate packets In accordance with the present invention, the defensive firewall/router 10 acting as a proxy uses a defense process to protect against such attacks while still providing useful information in response to legitimate pings This defense process 200 of the present invention is illustrated in tile flow diagram of FIG. 3.

Figure 3:
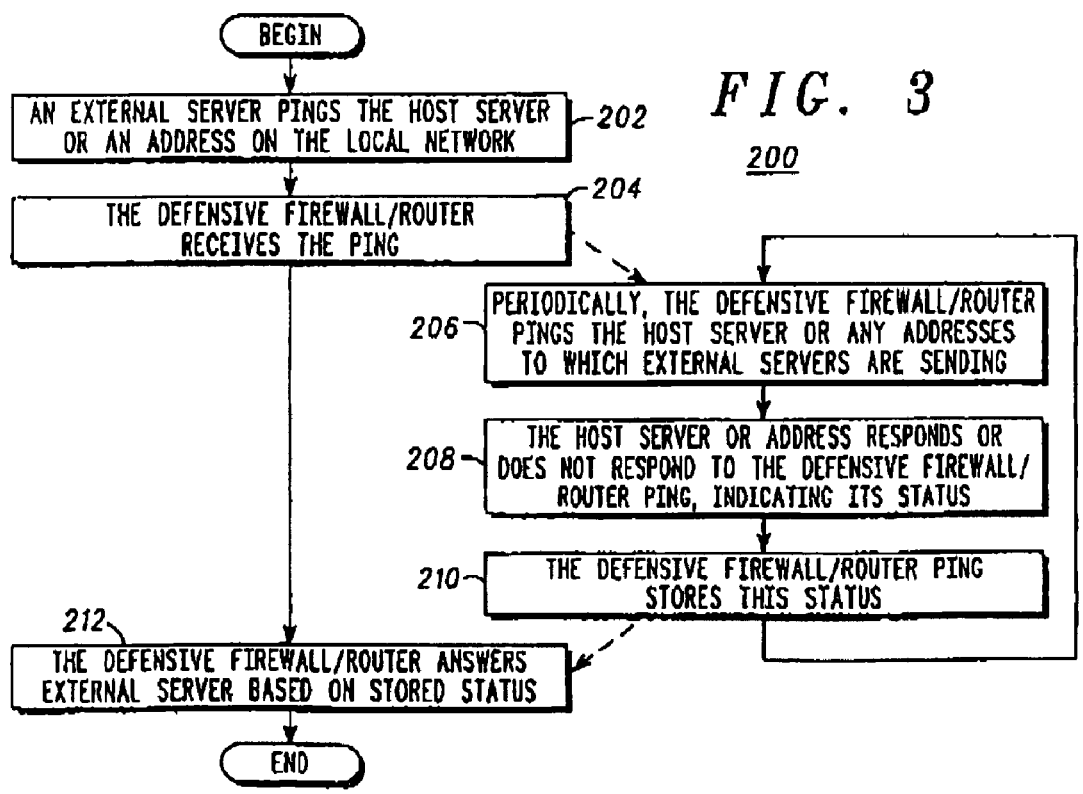
FIG. 3 is a flow diagram of one aspect of the Internet security feature in accordance with the preferred embodiment of the present invention.

Referring to FIG. 3, an external server 13a connected to the Internet infrastructure 12 requests (pings) the status of the host server 11 (Step 202). The defensive firewall/router 10, connected to the Internet infrastructure 12 through one or more connection(s) W, receives the requests from the external server 13a (Step 204) In accordance with a limited request rate, the defensive firewall/router 10 requests (pings) the status of the host server 11 or local network 14 (Step 206).

The request rate is limited based upon the granularity or accuracy set by the firewall/router 10 policy but no more often than the frequency of actual pings to the host server 11 or the address or local network 14, and may be set as desired by the system administrator. The more accurate the firewall/router 10 policy needs to be to respond to the requests (pings) received from external servers 13a . . . 13n, the more the firewall/router 10 requests (pings) the host server 11 or the address on the local network 14 The periodicity of the request by the firewall/router 10 may be based on a predetermined time period or based on the number of received pings from external servers 13a . . . 13n After the defensive firewall/router 10 sends a request (ping) to the host server 11 or the address on the local network 14 (step 206), the host server 11 or address on the local network 14 responds (or not) to the defensive firewall/router 10 to indicate its status (Step 208). The defensive firewall/router 10 stores the details of the reply, (or lack thereof), (Step 210) such as length of time until response, whether or not any response was received in a reasonable length of time, (as set defensive firewall/router policy), and for the local network case, which (if any) of such error indications as "host unreachable" or "network unreachable" was returned. The defensive firewall/router 10 responds to the requesting external server 13a (Step 212) based on the stored status from tie most recent ping to the host server 11 or address on the local network.

The defensive firewall/router 10 acting as a proxy for the host server 10 or the local network 14 in accordance with the present invention defends the host server 11 or local network 14 against attacks that attempt to exhaust all communication capacity or memory, or consume all processor capacity of the host server 10 or the local network 14 Eliminating the forwarding of requests (pings) in such a manner ensures that only a limited number of packets are responded to (i.e. a limited rate) by the host server 10 or local network 14.

It should be noted that steps 206-210 may be implemented after receiving a ping as shown, or may be implemented to step 202, and before any pings are received It is only necessary that the status of the host server 11 or address on the local network 14 be updated at a rate, (periodically or aperiodically), or set by the system administrator.

Another example of how the present invention may be utilized to defend against attacks on a host server is illustrated in the flow diagram of FIG. 4. As those skilled in the art realize, a synchronize/start (SYN) flooding attack keeps the targeted machine (host server 11 or local network 14) responding back to a nonexistent system The host server 11 or local network 14 is sent packets that ask it to respond to an external server 13a-13n with an incorrect IP address As it responds, it is flooded with the requests The host server 11 or local network 14 keeps track of these requests and waits for a response until the requests begin to time-out and are dropped.

During the waiting period, the host server 11 or local network 14 is consumed by the requests and cannot respond to legitimate requests.

Accordingly, the defensive firewall/router 10 of the present invention implements a procedure 400 to cope with such a SYN attack. The defensive firewall/router 10 periodically implements the same steps 206-210 to determine the status of the host server 11 or the address of the local network 14 and store the status in memory The period of the status check may be set as desired by the system administrator The defensive firewall/router 10 receives a SYN packet from an external server 13a-13n (Step 408) Tie defensive firewall/router 10 utilizes the pre-stored status of the host server 11 or address of the local network 14 and responds to the SYN packet with an error (Step 410) or with a SYN/ACK on behalf of the host server 11 or the address of the local network 14 (Step 412) In the event of a SYN/ACK response (Step 412) the defensive firewall/router 10 enters a "pending connection" slate and activates a timer. If the response to the SYN packet fails or the connection establishment attempt times out, no data packets are sent by tile firewall/router 10 to the host server 11 or the address of the local network 14, and the pending connection state of the defensive firewall/router 10 is cleared (Step 414) If the SYN packet succeeds, the firewall/router 10 tries to complete the "TCP three-way hand shake" with the host server 11 (or the address on the local network 14) and the external server 13a-13n (Step 418). If the hand-shake succeeds, tile data packets are forwarded to and from the host server 11 (or the address on the local network 14) by the defensive firewall/router 10 (Step 420) with appropriate header translations. Otherwise, the defensive firewall/router 10 sends a reset to the host sever 11, (or tile address on the local network), and external server 13a-13n and clears its pending connection state.

Using the method 400 of the present invention, the need to increase the capacity of SYN ACK queue is greatly reduced Since the host server 11 or address on the local network 14 never receives a SYN packet until a TCP hand-shake is established, the concern regarding flooding the host server 11 on the address on the local network with SYN packets and the resulting attempts to respond thereto disappear.

Although the invention has been described in part by making detailed reference to the preferred embodiment, such details are intended to be instructive rather than restrictive. It will be appreciated by those skilled in the art that many variations may be made in the structure and mode of operation without departing from the spirit and scope of the invention as disclosed in the teachings herein.

What is claimed is:

1. A firewall apparatus for defending a host, which is coupled to the Internet against a denial of service attack, said apparatus comprising:

a defensive router having a memory for storing the status of the host which is periodically determined, said defensive router receiving a request from an entity on the Internet for service from the host; and said defensive router replying to said entity by transmitting the stored status to the entity, whereby the defensive router acts as a proxy to defend the host against a denial of service attack, and wherein the host status is indicative of availability of the host.

2. The apparatus of claim 1, wherein the host is a host server.

3. The apparatus of claim 1, wherein the host is an address on a local network.

4. The apparatus of claim 1, wherein the status includes a response rate.

5. The apparatus of claim 1, wherein the status includes error indications.

6. A firewall apparatus for defending a host, which is coupled to the Internet against a synchronize/start (SYN) flooding attack, said apparatus comprising:

a defensive router having a memory for storing the status of the host which is periodically determined, said defensive router receiving a SYN packet from an entity on the Internet; and said defensive router replying to the SYN packet by transmitting the stored status to the entity, whereby if the stored status is favorable, the defensive router enters a pending connection state with the entity, and the defensive router acts as a proxy to defend the host against a denial of service attack, and wherein the host status is indicative of availability of the host.

7. The apparatus of claim 6, further comprising the step of: initiating a timer upon said reply.

8. The apparatus of claim 7, further comprising the step of: determining whether said timer has reached a predetermined limit.

9. The apparatus of claim 8, further comprising the step of: determining whether an error has occurred in response to said reply.

10. The apparatus of claim 9, further comprising the step of:

clearing the pending connection state if either an error has occurred or said predetermined limit has been reached.

11. The apparatus of claim 10, further comprising the step of attempting to establish a three-way connection between said defensive router, said host and said external server.

12. The apparatus of claim 11, further comprising the step of clearing the pending connection state if said attempt fails.

13. The apparatus of claim 11, further comprising the step of sending reset packets from said defensive firewall/router to said host and external server if said attempt fails.

* * * * *